June 20, 1950 J. F. LANGAN 2,512,106

RECORD CARD

Filed Jan. 3, 1946 3 Sheets-Sheet 1

INVENTOR.
JOHN F. LANGAN
BY Pennie, Davis, Marvin & Edmonds
ATTORNEYS

June 20, 1950

J. F. LANGAN

RECORD CARD 2,512,106

Filed Jan. 3, 1946

3 Sheets-Sheet 2

*INVENTOR.*

JOHN F. LANGAN

BY Rennie, Davis, Marvin & Edmonds

*ATTORNEYS*

RECORD CARD

Filed Jan. 3, 1946 3 Sheets-Sheet 3

INVENTOR.

JOHN F. LANGAN

BY Prunis, Davis, Marvin & Edmonds

ATTORNEYS

Patented June 20, 1950 2,512,106

UNITED STATES PATENT OFFICE 2,512,106

RECORD CARD

John F. Langan, White Plains, N. Y., assignor, by mesne assignments, to Film 'N File, Inc., New York, N. Y., a corporation of Delaware Application January 3, 1946, Serial No. 638,785

19 Claims. (Cl. 40—158)

This invention relates to improvements in record cards for card record systems such as indexing, cataloguing and classification systems, and more particularly to record cards used to index, catalogue or classify microfilm, motion picture film or the like.

The invention includes a new record card which is particularly advantageous for use in mounting microfilms or the like therein.

The invention also includes a new prepared card having an adhesive material as a part thereof and adapted for mounting therein microfilm or the like.

The invention also includes the completed record card with the microfilm or the like mounted therein.

One of the objects of the invention is the provision of a record card of a size suitable for use in standard indexing, cataloguing or classification systems, having one or more openings therein adapted for receiving microfilm or the like to be mounted therein, said card having portions or areas thereof adjacent to or surrounding such openings compressed to a thickness substantially less than that of the rest of the card. Another object of the invention is the provision of such a card in which portions or areas thereof adjacent to or surrounding the openings are compressed to a thickness substantially less than that of the rest of the card but to a thickness not less than that of the film or the like to be mounted therein.

It is a further object of the invention to provide such a card having a layer of thin adhesive material located in the depression formed by the compression of the card and adapted to adhere to and overlap at least the edges of the film, thereby to secure the film within the opening in the card, the depression being at least as deep as the thickness of the layer of adhesive material so that when such material is affixed to the card and film the outer surface of such material is substantially even with or slightly below the corresponding surface of the uncompressed portion of the card.

It is a further object of the invention to provide a completed record card with the film secured in an opening therein by a layer of thin adhesive material which entirely surrounds one surface of the film at its outer edges and which secures such edges to the surrounding adjacent compressed portion of the card, the outer surface of such material being substantially even with or slightly inside of the corresponding surface of the uncompressed portion of the card, and both surfaces of such film being substantially even with or slightly inside of the corresponding surfaces of the compressed portion of the card.

It is a further object of the invention to provide a record card containing a film or the like mounted therein and which has no portion projecting beyond the card on either side when the film is mounted therein and secured thereto by adhesive material.

A further object of the invention is to provide cards containing a film or the like mounted therein, in a manner so as not to increase the thickness of any portion of the card, and to provide such cards which can be stacked in piles or filed in rows of uniform height or depth. A further object of the invention is to provide such cards which can be satisfactorily and efficiently processed in standard business machines, such as perforating or punching machines, verifying machines, sorting machines, etc., of the type known and used commercially in connection with punched-card systems.

Other objects of the invention will appear from the following more detailed description.

In my prior application Serial No. 592,981, I have described a card record system for cataloguing material such as microfilm or the like, in which a record card is provided having an opening wherein the microfilm is mounted, a thin layer of adhesive material being secured to the card around the opening and overlapping at least the edges of the film when the film is inserted in the opening, so as to hold the film in place. Such cards have an area of slightly increased thickness where the adhesive material is located, and when assembled in piles or rows, they are not of uniform height or depth, and when a pile or row of them is compressed the pressure is applied largely at the portion of the card where adhesive material is located.

The present invention provides an improved record card for mounting film or the like therein which avoids the increased thickness due to the application of the adhesive material for mounting the film in the card. The invention also provides such a card which in its completed state is free from any areas of increased thickness, particularly at portions where the film is mounted in the card.

According to the present invention, a card in which a film or the like is to be mounted after the opening for the film has been cut or punched therein, is subjected to a high pressure over a limited area adjacent and surrounding the opening so as to form a compressed portion or shoulder in one side of the card surrounding the opening and so as to form no elevation or depression in the other side of the card. When suitably compressed, such shoulder is made substantially thinner than the original thickness of the card, whereby a permanent depression is formed in the card around the opening. The upper edge or rim of the compressed portion of the card is advantageously somewhat rounded so that the cards will slide over one another readily and without catching as they are handled or processed in their index files or in punched-card system perforating, sorting, etc., machines.

The pressure required for producing the depression will vary somewhat with different cards, but should be sufficient to produce the desired depression, without excessive pressure being applied which would unduly weaken or injure the compressed portion of the card. Cards of the type adapted for and commonly used in punched-card systems (hereinafter referred to as "standard classification cards") have a thickness, e. g. of 0.0067 inch, or in some cases e. g. of 0.0070 or 0.0075 inch. Depending somewhat on the physical characteristics of the card and on the pressure applied, the depth of the depression formed in the card around the opening may be about 0.0010 inch or somewhat more will be determined by the thickness of the adhesive material to be used therewith.

A thin sheet of adhesive material having a thickness approximating the depth of the depression is inserted in and affixed to the compressed portion of the card so that none of such material projects beyond the surfaces of the uncompressed portion of the card. Depending on the original thickness of the card employed, when a film is inserted in the opening and held in place by adhesive material affixed to the card in this manner, the combined thickness of the film and adhesive material may be substantially equal to or less than that of the original card, so that neither side of the resulting card has any projecting portions of film or adhesive material.

For example, by utilizing a standard classification card having a thickness of about 0.0070 or 0.0075 inch and by forming a suitable depression in the card around the opening, an adhesive material having a thickness of as much as 0.0015 inch can be used to mount a film having a thickness of as much as 0.0055 inch. Thus, the adhesive sheet can be affixed to the card within the depression so that its outer surface is substantially even with or slightly below the surface of the uncompressed portion of the card and so that there is no projection of the adhesive layer beyond the surrounding uncompressed surface of the card. Also, when the film is placed in the opening in the card and affixed to the adhesive material, the film surfaces will lie slightly inside of or will be substantially even with the surfaces of the compressed portion of the card, and neither surface of the film will project beyond the corresponding surface of the uncompressed portion of the card.

Where it is desired to afford added protection to the surfaces of the microfilm or other item which is to be mounted in a record card, it will be advantageous to use a card having a thickness somewhat greater than the combined thickness of the adhesive material and the film, and to compress the portion of the card around the opening just enough to allow the adhesive material to be positioned therein without extending beyond the corresponding uncompressed surface of the card, so that the resulting thickness of the compressed portion is somewhat greater than that of the film. Utilizing such a card, the adhesive material may be affixed to the film and to the card within the depression so that the outer surface of such material will be substantially even with or slightly below the corresponding uncompressed surface of the card, and yet the film may be mounted within the opening so that it lies substantially within the thickness of the compressed portion of the card.

I have found that standard classification cards can be compressed sufficiently around the opening in which the film or the like is to be inserted, and without weakening or injuring the card materially where compressed, so that a sufficient depression of a permanent nature is formed on the card for receiving an adhesive layer, whereby the adhesive layer will not project above the surrounding uncompressed surface of the card. With such a card the film may be positioned within the opening so as to lie within the thickness of the compressed portion of the card and so as not to project beyond either surface of the uncompressed portion of the card.

With record cards of the types employed commercially in indexing, cataloguing and classification systems and including standard classification cards, the compressed shoulder formed around the opening may vary in width, e. g., from about 1/16 inch to about 1/4 inch, depending on such considerations as the size and shape of the opening, the physical characteristics of the card, and the quality of the adhesive material employed. A good width for such a shoulder formed in a standard classification card is about 1/8 inch.

The formation in record cards of a compressed portion or shoulder around an opening such as hereinbefore described can be effected advantageously at the same time that the opening is cut or punched in the card, by a combined cutting and compression operation. Cards so punched and compressed can be manufactured rapidly and the blank cards so formed can be stored, shipped and handled in a manner similar to that employed with blank cards which have had the opening cut therein without being subjected to such compression and without having had the compressed portion formed therein.

Cards so prepared can be provided advantageously with adhesive material and a protective cover layer in the same general manner described in my prior applications, Serial No. 601,857 and Serial No. 609,424, the latter now abandoned, with the added advantage that the adhesive material does not project beyond the surface of the card, but instead is contained within the depression in the card.

Similarly, completed film library cards may be made from the new cards by mounting film therein much as described in my prior application, Serial No. 592,981, but with the added advantage that the completed card with the film mounted therein and securely held in place by the adhesive material has a thickness where the film and adhesive material are located which is substantially the same as or less than that of the other portions of the card.

The invention will be further described in connection with the accompanying drawings, which illustrate, in a somewhat conventional and diagrammatic manner, certain embodiments of the invention, but it will be understood that the invention is not limited thereto. In some of the figures of the drawings, some parts are shown on an enlarged and exaggerated scale for purposes of illustration.

Figure 1:
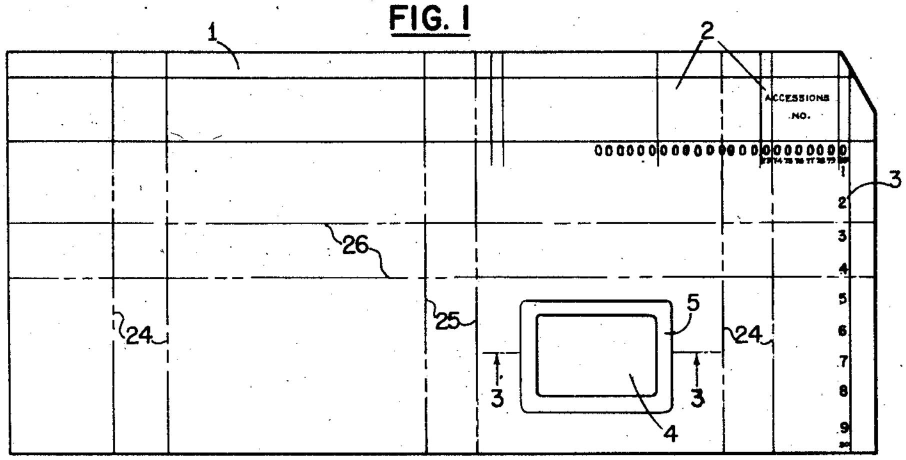
Fig. 1 illustrates in plan view one embodiment of a card, with one opening therein, and having a compressed portion surrounding the opening.

The card 1 shown in Fig. 1 represents a standard classification card of a size and nature adapted for use in standard punched-card perforating, verifying, sorting, etc., machines, this card having the usual or any desired column headings across the top thereof which are indicated generally at 2, and having numbers along one end, indicated generally at 3, representing horizontal rows. The intersections between the columns and rows are adapted to be perforated according to a code of the characteristics of the films to be inserted in the cards. The card is shown in Fig. 1 as having an aperture or opening 4 of a size adapted to receive a microfilm or section of a motion picture film, and immediately surrounding this opening 4 is a compressed and depressed portion or shoulder 5.

Figure 2:
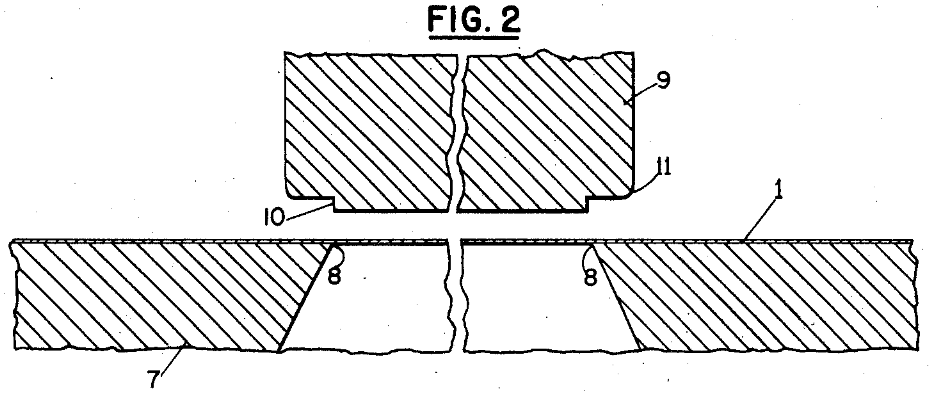
Fig. 2 is a sectional view on an enlarged scale, with parts somewhat exaggerated, illustrating diagrammatically the manner in which the opening in the card and the depression in the adjacent surrounding portion can be formed by a single operation.

In Fig. 2, there is shown somewhat conventionally and diagrammatically a combined punch and press for forming the aperture 4 and the compressed area 5. In the apparatus shown, the anvil 7 is provided with an opening 8 of the size of the aperture to be made in the card. A punching and pressing die 9 is adapted to be reciprocated toward and away from the anvil 7 and has a punching-die portion 10 of the same size and shape as the opening 8 in the anvil 7 so that it will just pass through the opening 8 and cut an opening of corresponding size in the card. Surrounding the punching-die portion 10 of the die are compression shoulders 11 of such width and shape as to form the compressed and depressed portion or shoulder 5 in the upper side of the card surrounding the aperture 4. The anvil 7 supports the card 1 so that no elevation or depression is produced in the under side of the card as the shouldered depression 5 is formed in the upper side thereof. A sufficiently high pressure is used to compress the card sufficiently to form a permanent depression therein, but without the use of excessive pressure which would weaken or injure the card. The shoulders 11 are rounded at their outer edges so that the upper edge or rim 12 of the depression 5 is somewhat rounded. The corner portions of the shoulders 11 and of the punching-die 10 are also rounded so that the corners of the depressed shoulder 5 and the opening 4 are rounded. By making these parts of the card somewhat rounded, the tendency for parts of one card to catch on another as they are handled and processed through punched-card system machines is minimized. Also by reason of the corners on the shoulders 11 being rounded, the depression may be formed in the card without danger of breaking or tearing the surface thereof.

Figure 3:
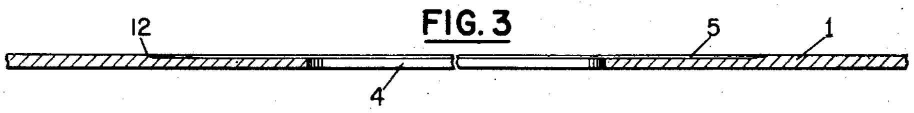
Fig. 3 is an enlarged sectional view along the line 3—3 of Fig. 1.

The card resulting from this combined punching and compressing operation is illustrated in Fig. 1, and a section through this card is illustrated in Fig. 3.

Figures 4, 5:
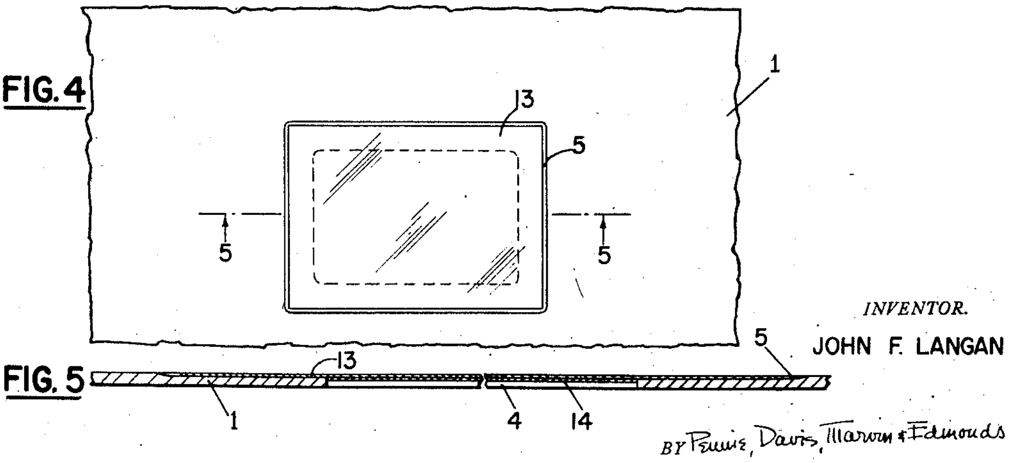
Fig. 4 is an enlarged plan view of a portion of the card of Fig. 1 with a sheet of adhesive material secured to the card within the compressed portion.
Fig. 5 is an enlarged sectional view along the line 5—5 of Fig. 4, and also showing a removable cover sheet applied to the adhesive material.

In Fig. 4, a continuous sheet of adhesive material 13 is shown inserted in the depressed portion 5 of the card and entirely covers the opening in the card. Fig. 5 shows a section through the card of Fig. 4, with a protective and removable cover sheet 14 applied to the adhesive material 13.

The adhesive material represented is a pressure-sensitive adhesive material such as marketed under the name of "Clearseal" or "Duraseal," and is a thin sheet of cellophane or the like coated on one side with a slow-acting, inert pressure-sensitive adhesive. Some such materials have a thickness, e. g. of about 0.00088 inch, and others have a thickness, e. g. of about 0.0015 inch. The thickness of the adhesive layer used is approximately equal to the depression formed by compressing the card. Or, otherwise stated, the card is compressed to give it a permanent depression approximately equal in depth to the thickness of the adhesive sheet to be applied therein. For example, with standard classification cards having a thickness of about 0.0067 inch, and in using such a card with an adhesive having a thickness of about 0.00088 inch, the compression of the card around the opening should be such as to decrease the thickness of the card approximately 0.001 inch. The compressed portion of the card will in this case be approximately the same as the thickness of standard microfilm, e. g. about 0.0055 inch.

Where the adhesive sheet 13 is applied to the card immediately prior to the insertion of the film therein, no protection of the adhesive sheet is required. But where it is desired to produce cards which are to be shipped or stored and subsequently used for mounting films, or where the cards are to be classified by perforating prior to the insertion of the films, the adhesive surface of such sheet is advantageously protected by a readily removable material such as glassine paper, illustrated at 14, one side of which has a smooth and glassy surface such that it will be held in place by the adhesive but can be stripped off readily when desired by lifting a corner or edge thereof with a sharp instrument and by then pulling it away from the adhesive material.

Figs. 6 through 9 illustrate a card in which the center of the adhesive layer or sheet 13 is cut away to leave an inner margin 15 extending all the way around and into the aperture 4 for securing the film thereto, the sheet 13 lying within the depression formed in the card. The inner corners of the margin 15 are rounded. The location and form of this adhesive layer is further illustrated in the sectional view of Fig. 7.

Figure 6:
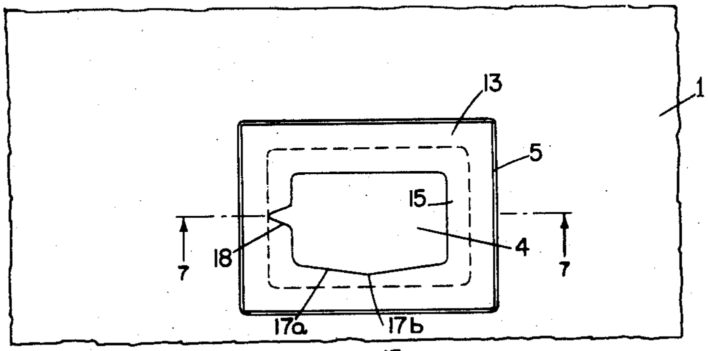
Fig. 6 is an enlarged plan view of a portion of the card of Fig. 1 with a modified form of adhesive material secured thereto.
Figure 7:
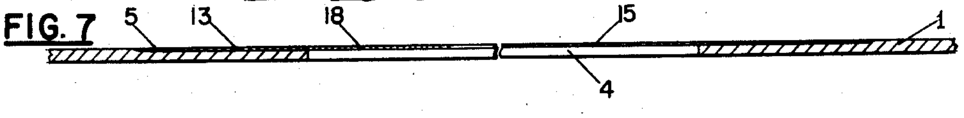
Fig. 7 is an enlarged sectional view along the line 7—7 of Fig. 6.
Figures 8, 9:
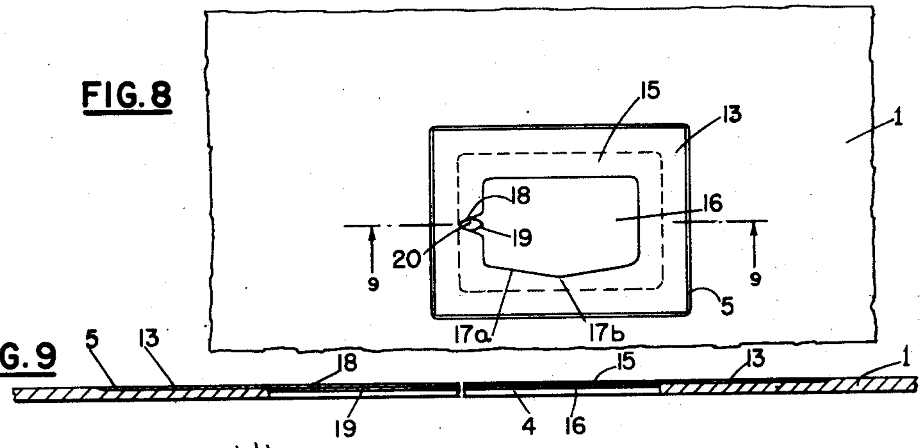
Fig. 8 is a plan view of the portion of the card of Fig. 6 with a removable protective sheet applied to the adhesive material.
Fig. 9 is an enlarged sectional view along the line 9—9 of Fig. 8.
Figure 10:
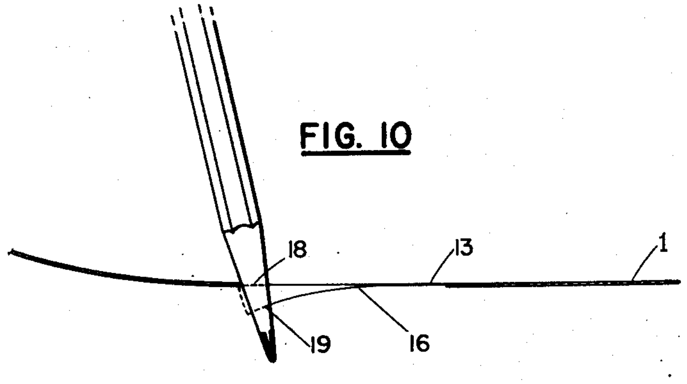
Fig. 10 is an enlarged sectional view illustrating one method of separating the protective sheet from the adhesive material.

Figs. 8 and 9 show a temporary cover sheet 16, e. g. glassine paper, secured to the margin 15 within the opening. To facilitate the removal of the cover sheet 16, as shown in Figs. 6 through 9 one side of the adhesive margin 15 is provided with a more or less V-shaped notch 18, and the corresponding edge of the cover sheet 16 is provided with a similar but inverted notch 19, these notches registering as shown in Fig. 8 to provide a small opening 20. One way of removing the cover sheet is illustrated in Fig. 10, a pencil or similar pointed instrument being inserted in the opening 20 to start the removal of the cover sheet 16 so that it can be readily grasped and stripped off the adhesive margin 15. To prevent tearing of the adhesive material 13 and to prevent premature tearing of the cover sheet 16, as the pointed instrument is inserted in the hole 20, the bottoms of the notches 18 and 19 are advantageously somewhat rounded as shown in Figs. 6 and 8.

Figures 11, 12, 13:
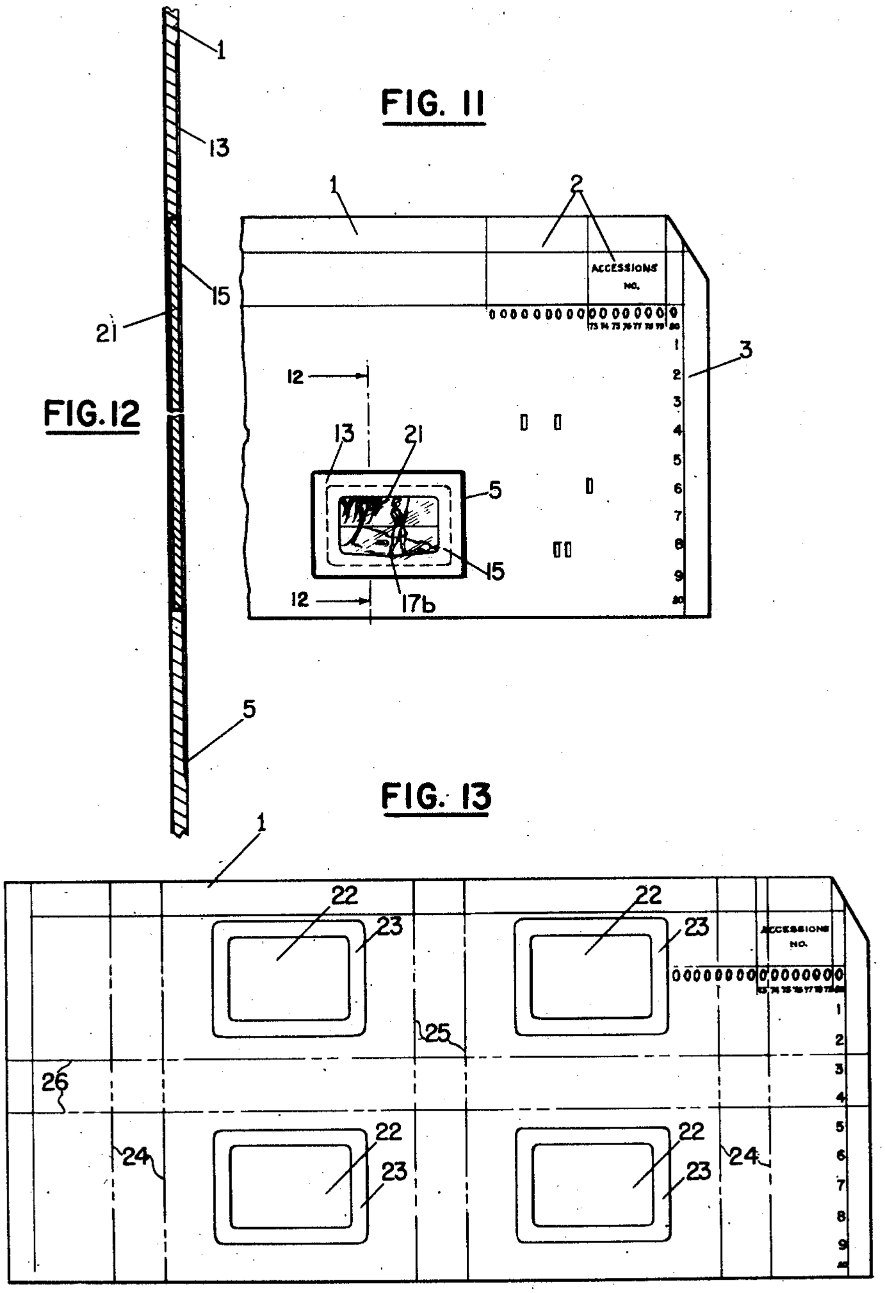
Fig. 11 is a plan view of a portion of a completed card with a film mounted therein.
Fig. 12 is an enlarged sectional view along the line 12—12 of Fig. 11.
Fig. 13 is a plan view of a modified form of card with a plurality of film-receiving apertures formed therein, each surrounded by a compressed portion of the card.

Standard classification cards such as shown in the drawings, when being processed in a sorting machine, are fed from the bottom of a stack or pile through the machine with the face or upper surface of the card down, the bottom edge of the card, as shown in Fig. 11, being the leading edge. In the drawings the depressions have been shown as being formed in the upper surface of the cards. To assist the cards in sliding under one another as they are fed into a sorting machine, one edge 17a of the adhesive margin 15 is cut on an angle as shown as to produce a deeper center portion 17b in this edge of the margin. (See Figs. 6 and 8.)

A portion of a completed card with a film mounted therein is illustrated in Fig. 11, and a portion of this card including the compressed and depressed area is shown in enlarged section in Fig. 12, the film 21 being secured around its edges to the margin 15 of the adhesive material 13. It will be seen from Fig. 12 that the adhesive sheet 13 is located in the depression 5 formed by compressing the card and that the film 21 is of practically the same thickness as the compressed portion of the card, so that the combined thickness of the film and adhesive sheet is substantially the same as the thickness of the uncompressed portion of the card, and so that the completed card has no projecting portions, either of film or adhesive material.

If a film or the like is to be mounted in a record card by means of a continuous adhesive sheet such as shown in Fig. 4, it will be necessary for the adhesive sheet to be transparent so that light may be transmitted through the film for projection or reproduction purposes. If a film or the like is to be mounted in the manner shown in Fig. 11, the adhesive layer is advantageously transparent so that there will be no appreciable interference with the transmission of light through all portions of the mounted film if desired.

Fig. 13 illustrates a modified form of the new card in which four apertures 22 are provided, each having a surrounding depression 23 formed by compressing the card, so that four microfilms or other similar items can be mounted in the card in the manner described. The depressions may all be formed in one side of the card, or some may be formed in one side and some in the other. Although the card shown in Fig. 13 is provided with four film-receiving openings, it is to be understood that cards provided with more or less openings may also be made.

In Figs. 1 and 13 the dot and dash lines indicated at 24 illustrate conventionally the paths of travel of the feeding rollers or devices by which the cards are fed thru the standard sorting machines. The area between the dot and dash lines indicated at 25 is the portion of the card that passes thru the feeding throat of such a machine, which throat controls the passage of cards into the machine. This area of the card also passes along the guide bands of such a machine. The dot and dash lines indicated at 26 illustrate conventionally the path of travel of the feeding devices of a standard perforating machine as the card is passed thru such a machine. The openings in the card into which the films are inserted, as well as the depressed portions of the card are located advantageously in areas which are not traversed by the throat or guide bands of the sorting machine or by the feeding mechanism of the sorting or perforating machines.

Perforating the cards for classification purposes may be done after the films have been mounted therein, but in some instances, it may be more advantageous to perforate the cards with the proper classification for indexing, etc. before the films are inserted.

The new cards provided with the adhesive material and protective cover layer can be processed efficiently and without difficulty in standard perforating, verifying, etc. machines, and can be likewise processed or handled during perforating and prior and subsequent thereto, as they have no projecting portions and no portions of increased thickness to interfere with the storing, piling, handling or processing thereof. The new completed cards with film mounted in them are particularly well adapted for use in indexing and classification systems which utilize machines such as are commonly employed in punched-card systems, and such cards may be processed efficiently and without difficulty in standard perforating, verifying, sorting, etc., equipment, and can be handled or processed during perforating and prior and subsequent thereto, without having any projecting portions or portions of increased thickness to interfere with the storing, piling, handling or processing thereof.

When it is necessary to index or catalogue a large number of films such as microfilm or sections of motion picture film, and to file them so that they can be made available readily when desired, with a minimum of work and trouble, the present invention enables the films to be mounted in cards classified by perforations, so that the cards may later be processed through standard sorting machines to select those which contain films having desired classified subject matter. The new cards, from the time they are first punched to form the opening and depression therein, and during the subsequent operations of applying the adhesive, protecting it with a cover sheet, processing the resulting card thru standard perforating, verifying, etc., machines, mounting the films in the cards, storing such cards, and subsequently sorting the completed cards by machine methods, can be so processed without difficulty, as the cards have no projecting portions and as no portion of the cards is thicker than the main portion thereof.

Although the invention has been particularly described with reference to the embodiments thereof shown in the drawings as applied to record cards of the type described as standard classification cards, it is to be understood that other types of record cards may be employed for mounting microfilm or the like therein in the manner described, and that such cards may be indexed and sorted according to other methods of classification, such as by alphabetizing or by arranging them according to a previously divised code. This application is a continuation-in-part of my copending application Serial Nos. 610,813 and 610,814, filed August 14, 1945.

I claim:

1. A record card for mounting film and the like comprising a thin flexible card adapted for use in card classification systems and having an aperture, a portion of the card being compressed to form a permanent depression in one side of the card around said aperture, a thin sheet having a coating of pressure-sensitive adhesive material thereon secured by said adhesive to the card only within said depression around the edges of said aperture and extending across said edges and over at least a part of said aperture with the adhesive exposed toward the other side of the card, and a temporary thin cover sheet fitting within said aperture secured to said exposed adhesive and forming with the adhesive coated sheet a continuous card surface over the aperture at one side of the card, said cover sheet being removable for insertion of a film and the like in said aperture.

2. A record card for mounting microfilm and the like as defined in claim 1 wherein the adhesive coated sheet has an opening therein leaving only a margin thereof projecting into said aperture around its edges and leaving a major portion of the aperture uncovered thereby.

3. A record card as defined in claim 2 in which the aperture in the card is a rectangular aperture, and the marginal edges of the adhesive coated sheet project into the aperture and one edge of the opening in said sheet extends in a non-parallel direction to the opposite edge of said aperture.

4. A record card as defined in claim 1 in which the surface of the cover sheet in contact with the adhesive coating is a smooth and glassy surface for which the adhesive has relatively little affinity.

5. A record card for mounting film and the like comprising a card having an aperture therein, the edge portions of the card adjacent the aperture being shouldered, and a sheet of material onto which a film is adapted to be secured extending over the aperture and having its outer edge portions secured to said shouldered portions of the card, said sheet of material having an opening therein, the edge of the opening lying inwardly of the edges of the aperture in the card.

6. A record card as defined in claim 5 wherein said sheet of material is transparent.

7. A record card as defined in claim 5 wherein said sheet of material has its outer face lying substantially in the plane of the adjacent face of the card.

8. A record card as defined in claim 5 including a protective cover positioned within said aperture and secured to said sheet of material across the opening therein.

9. A record card as defined in claim 5 including a film within said aperture and secured to said sheet of material.

10. A record card as defined in claim 9 wherein said sheet of material is transparent and the opening is in the central portion thereof.

11. A record card having an aperture therein and a film mounting in said aperture, said record card having a sheet of transparent material over the aperture at one face of the card and with the edges of said sheet overlapping the card around the aperture, the overlapping edges of the card and sheet being compressed and having the sheet embedded into the surface of the card a distance equal to the thickness of the sheet, with the outer surface of the sheet lying in the plane of the adjacent surface of the card, and the film being secured in said aperture to the sheet by a plastic bond.

12. A record card having an aperture therein and adapted for the mounting of a film in said aperture, said card having a sheet of transparent material secured over the aperture at one face of the card with the edges of said sheet overlapping the card around the aperture, and with the overlapping edges of the card and sheet compressed and the sheet embedded into the surface of the card a distance equal to the thickness of the sheet, with the outer surface of the sheet lying in the plane of the adjacent surface of the card, said card being adapted for the insertion of a film in said aperture against said sheet.

13. A card as defined in claim 12 in which the sheet of material secured to the card has an opening therein of smaller size than the aperture and has a marginal portion extending into the aperture around its edges adapted for the securing of a film thereto.

14. A record card adapted for use in card record systems comprising a card having an aperture formed therein and having a portion thereof compressed to form a permanent depression around said aperture, and a sheet having a coating of pressure sensitive adhesive material thereon and being secured thereby to said card within such depression, said sheet having an opening therein, the edge of the opening lying inwardly of the edges of the aperture in the card.

15. A record card as defined in claim 14 including a film positioned within the aperture and affixed to said sheet by the pressure sensitive adhesive material thereon.

16. A record card as defined in claim 15 wherein the thickness of the sheet is not greater than the depth of said depression and the thickness of the film is not greater than the thickness of the compressed portion of the card.

17. A record card as defined in claim 14 including a protective cover positioned within said aperture and affixed to said sheet by the pressure sensitive adhesive material thereon.

18. A record card as defined in claim 17 wherein the pressure sensitive adhesive material has relatively little affinity for the cover, whereby the latter is readily removable.

19. A record card as defined in claim 17 wherein the thickness of the sheet is not greater than the depth of said depression and the thickness of the cover is not greater than the thickness of the compressed portion of the card.

JOHN F. LANGAN.

REFERENCES CITED

The following references are of record in the file of this patent:

UNITED STATES PATENTS

| Number | Name | Date |
|---|---|---|
| 1,467,108 | Hodgson | Sept. 4, 1923 |
| 1,498,895 | Theriault | June 24, 1924 |
| 1,549,118 | Harvey | Aug. 11, 1925 |
| 1,592,711 | Acklin | July 13, 1926 |
| 1,926,553 | Morse | Sept. 12, 1933 |
| 2,096,389 | Bode | Oct. 19, 1937 |
| 2,165,250 | George | July 11, 1939 |
| 2,256,399 | MacHarg | Sept. 16, 1941 |
| 2,338,189 | Libby et al. | Jan. 4, 1944 |